M. SCHUSTER.
MACHINE FOR TURNING GREEN MALT.
APPLICATION FILED JUNE 10, 1913.

1,143,918.

Patented June 22, 1915.
2 SHEETS—SHEET 1.

WITNESSES:
John C. Sanders
Albert F. Newman

INVENTOR:
Max Schuster
by Wm. Hallaw White
ATT'Y

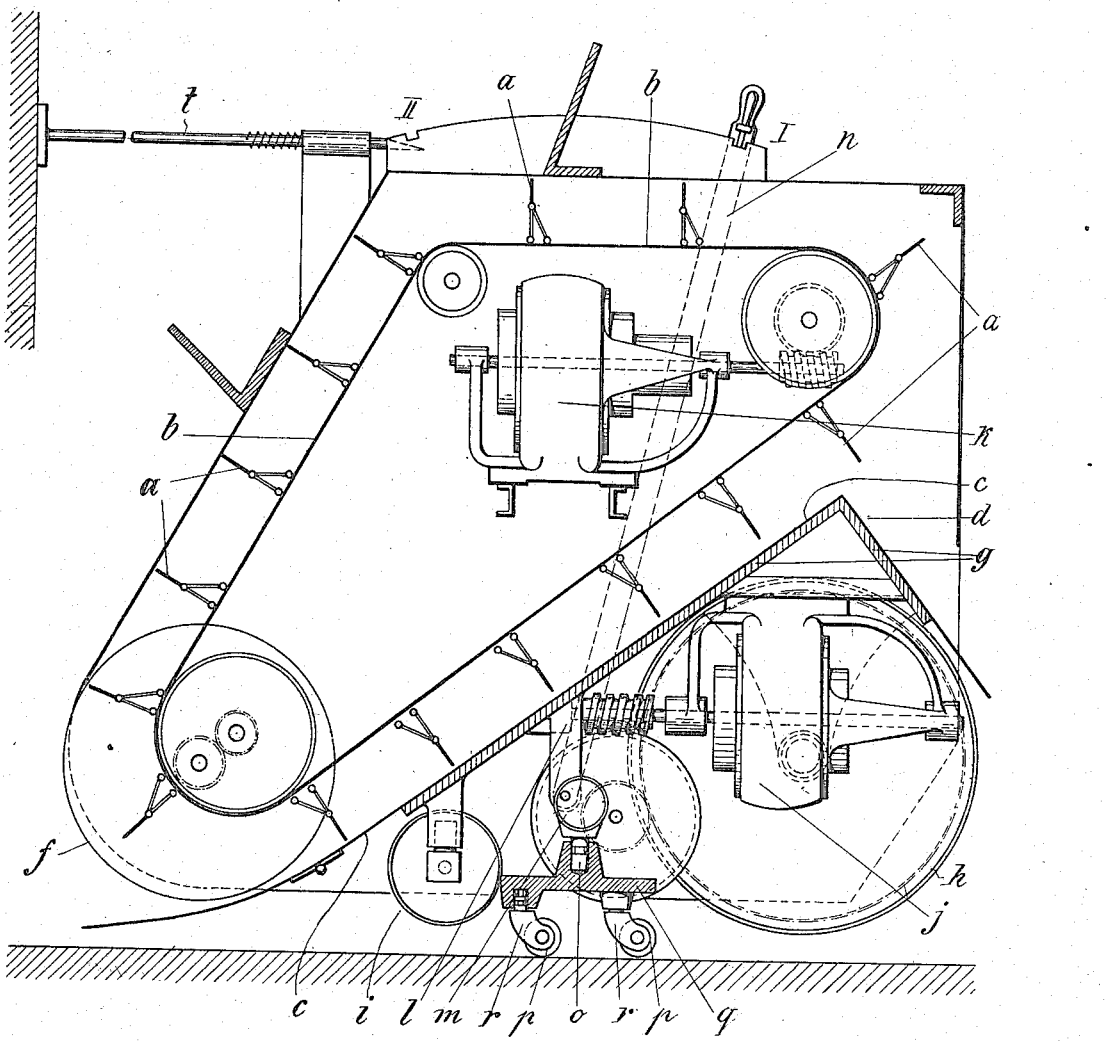

UNITED STATES PATENT OFFICE.

MAX SCHUSTER, OF VIENNA, AUSTRIA-HUNGARY.

MACHINE FOR TURNING GREEN MALT.

1,143,918.  Specification of Letters Patent.  Patented June 22, 1915.

Application filed June 10, 1913. Serial No. 772,764.

*To all whom it may concern:*

Be it known that I, MAX SCHUSTER, engineer, a subject of the Emperor of Germany, whose post-office address is Währingerstrasse 182, Vienna XVIII, Empire of Austria-Hungary, have invented a certain new and useful Machine for Turning Green Malt, of which the following is a specification.

The present invention relates to a specially free-traveling apparatus for turning green malt. The free-traveling green malt turners hitherto known are devised to act so that the turning apparatus is pushed forward through the piled up malt, turning and aerating a longitudinal row of the malt. At the end of this forward motion, the turning apparatus describes a curve and travels backward along one of the subsequent rows, for instance, the fourth, in transverse measurement in the opposite direction. After turning and aerating this fourth row, the apparatus again describes a curve and returns to the second longitudinal row, turns this and then passes to the fifth row, and so forth. This, or any similar method of working, possesses the drawback that a great deal of time and labor is wasted, because during the turning of the apparatus in an arc, no useful work is done. The space which is necessary for the turning of the apparatus cannot be covered with malt, so that even the available space of the malt floor is irregularly disturbed by this method of working. The limits of the rows of malt originally marked by straight lines become after working wavy and very irregular lines. These drawbacks are materially if not completely obviated by the malt turning apparatus which is the subject of the present invention. The turning apparatus is at the end of each turning of a longitudinal row of the green malt, removed parallel to itself to an adjacent row and turned by 180° so that the turning apparatus in this new motion which takes place in the opposite direction, turns and aerates the adjacent row of the malt.

Figure 1:
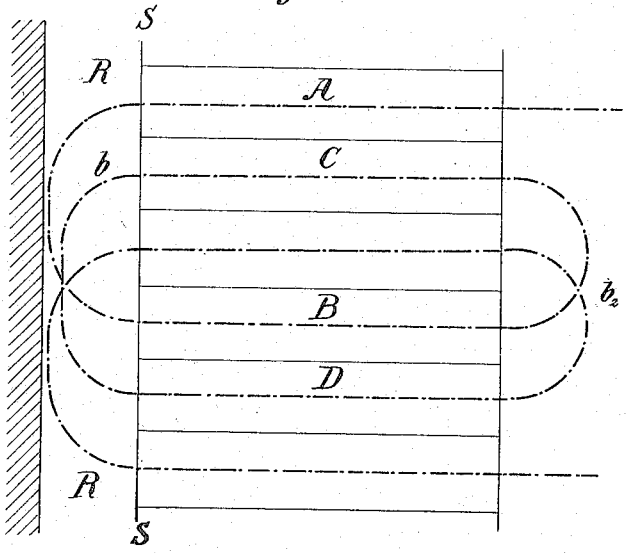
Figure 2:
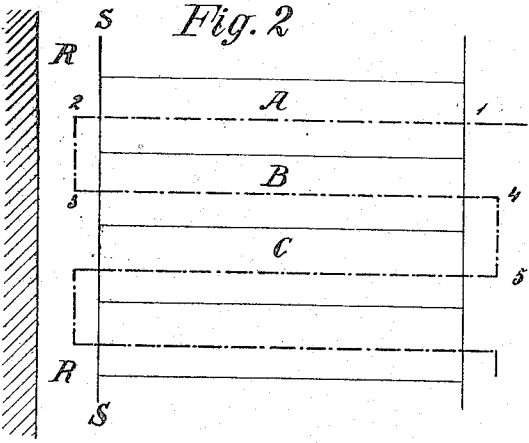

In the accompanying drawings Figure 1 illustrates diagrammatically the track of the ordinary malt turning apparatus as above described. Fig. 2 describes diagrammatically the track of the improved malt turning apparatus of the present inventor. Fig. 3 shows in sectional elevation the details of the invention.

It will be seen that in Fig. 1 the apparatus commencing its journey from right to left, passes through the row A as indicated by the dotted dash line, turns in the space marked R, returns from left to right, along the row marked B, turns again in the space marked $b^2$, returns along the row C, turns at $b$ and returns through D and so forth, whereas according to Fig. 2, the new apparatus, commencing at the point marked 1, traverses the row A to the point 2, is turned before arriving at the point marked 3, traverses the row B to 4, turns before it reaches the point 5, traverses the row C and so forth, thus working adjacent rows in consecutive order.

Instead of the large curves $b'$, $b^2$ shown in Fig. 1, we have short parallel displacements from one adjacent row to another shown in Fig. 2. Consequently, the waste of time and labor involved in reversing the apparatus which cannot be altogether avoided is very considerably reduced as compared with the previous method. Moreover, for the effecting of the turning motions of the apparatus a very considerably smaller free space R, R is necessary and the malt floor is therefore better utilized than before. The improved operation is always completely uniform, especially in view of the fact that the immediately adjacent row is turned next, the terminal lines S, S of each row remain constant and any disordering of the rows is avoided.

Referring now to the details of the apparatus illustrated in Fig. 3: The apparatus comprises an endless band $b$ provided with stirrers $a$, which band is arranged above an inclined plane $c$ so that the malt to be turned is carried up over the inclined plane to another inclined plane $d$ connected therewith, from which it slides down and is thereby turned over. At the front end of the inclined plane $c$ gripping shoes $f$ are provided. Beneath the inclined plane $c$ is arranged a supporting frame $g$ upon which the apparatus rests. The traveling wheels $h$, $i$ are connected with this frame. The running wheel $h$ is actuated by an electromotor $j$ with interposition of a worm and effects the motion of the apparatus along the malting floor, the steering of the machine being effected by means of the pair of wheels $h$, which are pivotally supported. An electromotor $k$ effects by means of a worm gearing the driving of the transporter band $b$. In the journals $l$ of the frame c is supported a shaft having upon it an eccentric m which can be rotated by means of a lever n fixed upon the eccentric shaft. The eccentric m is supported upon a vertical pivot o which is carried by a circular carriage q resting upon casters p. The supports r of the casters p are rotatably attached to the carriage q so that on turning the carriage about the pivot o the casters p can adjust themselves according to the direction of motion. During the working motion the frame g is supported upon the wheels h, i. When the apparatus after the finishing of the longitudinal motion 1, 2 (Fig. 2) and the turning over of the row A arrives at the point 2, then the lever n is moved out of the position indicated at II along the guiding arc into the position I shown in the drawing, in which position it is locked. In consequence of the turning of the eccentric m occasioned by this motion, the frame g with the machinery is lifted as shown in Fig. 3. The frame g therefore no longer rests upon the traveling wheels h, i, but is supported upon the casters p of the carriage q. The apparatus can then be pushed in a direction parallel to its previous motion and be brought to the point 3 in front of the adjacent longitudinal row b (Fig. 2). The frame g with the apparatus is moreover revolved upon the pivot o by 180° so that the front end of the machine is turned toward the end of the adjacent row B. The lever m is then restored again to the position II and the eccentric m thereby turned back again. The running wheels h, i again rest upon the floor and the apparatus can then move in the opposite direction along the track 3, 4 and turn over the row B. At the point 4, the parallel displacement of the apparatus takes place as far as the position 5 in front of the adjacent row C. After the machine is rotated 180° the operation can be repeated on the row C.

It is obvious that at the end of each longitudinal motion of the apparatus it may be first turned around and then be moved parallel to the adjacent row to be operated. Upon the top of the machine there is provided a longitudinally movable bar t the rear end of which is placed in front of the lever n, which is in the position II during the working motion of the apparatus. As soon as the bar t encounters an obstacle, for instance, a wall, if the workman has omitted to stop the machine in time, then the bar t being thereby pushed back, effects directly or with aid of suitable intermediate parts the moving of the lever out of the position II into the position I, whereby in consequence of the turning of the eccentric m the bearer frame g is lifted together with the machine up from the malt floor and the forward motion thereof is stopped almost instantly.

The arrangement for the lifting of the machine serves in combination with the bar t also as a safety apparatus for the machine. Moreover, the lifting device renders it possible to stop the apparatus at any moment during its working course.

I claim:

1. In a traveling malt turner, the combination of a rotatable carriage, a frame operatively connected thereto, a malt turning machinery carried by said frame, wheels mounted upon said frame and normally engaging the floor, and lever operated eccentric means for raising said frame relatively to said carriage whereby said wheels will be lifted out of engagement with said floor and said frame will be supported by the said carriage to permit parallel displacement of the frame on the carriage.

2. In a traveling malt turner, in combination, a swiveled carriage, a frame pivotally connected thereto, a malt turning machinery carried by said frame, wheels mounted on said frame and normally engaging the floor, and cam operated means for raising said frame relatively to said carriage whereby said wheels will be lifted out of engagement with said floor and said frame may be rotated on a vertical axis about its pivotal connection with the carriage.

3. In a traveling malt turner, in combination, a carriage, a frame operatively connected thereto, malt turning machinery carried by said frame, wheels mounted upon said frame and normally engaging the floor, means for raising said frame relatively to said carriage whereby said wheels will be lifted out of engagement with said floor and said frame will be supported by said carriage, and means adapted to be engaged by an obstacle in the path of the malt turner for automatically actuating said raising means.

In testimony whereof I have signed my name to the foregoing specification in the presence of two subscribing witnesses.

MAX SCHUSTER.

Witnesses:
 GUSTAV WOLFF,
 AUGUST FUGGER.

Copies of this patent may be obtained for five cents each, by addressing the "Commissioner of Patents, Washington, D. C."